United States Patent
Ros

(10) Patent No.: US 10,476,055 B2
(45) Date of Patent: Nov. 12, 2019

(54) BATTERY COVER REMOVAL TOOL INTEGRAL TO A DEVICE

(71) Applicant: Revolar Technology Inc., Denver, CO (US)

(72) Inventor: Jacqueline V. Ros, Denver, CO (US)

(73) Assignee: Revolar Technology Inc., Denver, CO (US)

( * ) Notice: Subject to any disclaimer, the term of this patent is extended or adjusted under 35 U.S.C. 154(b) by 0 days.

(21) Appl. No.: 15/421,909

(22) Filed: Feb. 1, 2017

(65) Prior Publication Data

US 2017/0222198 A1    Aug. 3, 2017

Related U.S. Application Data

(60) Provisional application No. 62/289,832, filed on Feb. 1, 2016.

(51) Int. Cl.
*H01M 2/00* (2006.01)
*H01M 2/10* (2006.01)

(52) U.S. Cl.
CPC ...... *H01M 2/1066* (2013.01); *H01M 2220/30* (2013.01)

(58) Field of Classification Search
CPC .. H01M 2/1005; H01M 10/425; H01M 10/02; H01M 2010/4278; H01M 2220/30
See application file for complete search history.

(56) References Cited

U.S. PATENT DOCUMENTS

| 6,357,534 B1 | 3/2002 | Buetow et al. | |
| 9,716,524 B2* | 7/2017 | Rostami | H04B 1/3888 |
| 2004/0251873 A1* | 12/2004 | Simoes | H01R 31/06 320/114 |
| 2015/0180527 A1* | 6/2015 | Fathollahi | H04B 1/3888 455/575.8 |
| 2015/0214520 A1 | 7/2015 | Nishikawa et al. | |
| 2016/0294201 A1* | 10/2016 | Avital | H01R 31/065 |

FOREIGN PATENT DOCUMENTS

| RU | 2121196 | 10/1998 |
| WO | 9605623 | 2/1996 |
| WO | 2013139372 | 6/2013 |

OTHER PUBLICATIONS

International Application No. PCT/US17/16089, filed Feb. 1, 2017, Written Opinion of the International Searching Authority dated May 11, 2017.
Youtube, Fitbit Zip Battery Change, Do it yourself Home Automation (Diy-ha.com), https://www.youtube.com/watch?v=28zjOO-pKIg, last visited Jan. 14, 2016.

\* cited by examiner

*Primary Examiner* — Cynthia H Kelly
*Assistant Examiner* — Monique M Wills
(74) *Attorney, Agent, or Firm* — Sheridan Ross P.C.

(57) ABSTRACT

A first apparatus includes a mobile battery powered device comprising a battery cover. The battery cover includes a socket recess. The apparatus includes a mating tool for the socket recess. The mating tool is integral to the mobile battery powered device. The mating tool and socket recess correspond in size and shape.

20 Claims, 8 Drawing Sheets

Section A-A'

BATTERY COVER REMOVAL TOOL INTEGRAL TO A DEVICE

CROSS-REFERENCES TO RELATED APPLICATIONS

This application claims the benefit of U.S. Provisional Patent Application No. 62/289,832 entitled "A BATTERY COVER REMOVAL TOOL INTEGRAL TO A DEVICE" and filed on Feb. 1, 2016 for Jacqueline V. Ros which is incorporated herein by reference for all purposes.

FIELD

This invention relates to a removal tool and more particularly relates to a battery cover removal tool that is integral to the device.

BACKGROUND

Mobile technology devices require optimal design considerations and are especially cognizant of size. Batteries and battery covers may be designed with these considerations. As such battery covers may be small and difficult to remove and many device manufacturers include a battery cover removal tool in conjunction with their respective mobile technology device. The removal tool may then be lost, misplaced, temporarily inaccessible, or otherwise inaccessible when a user needs to replace the battery.

SUMMARY

Apparatuses for opening a battery compartment is disclosed. A first apparatus includes a mobile battery powered device comprising a battery cover. The battery cover includes a socket recess. The apparatus includes a mating tool for the socket recess. The mating tool is integral to the mobile battery powered device. The mating tool and socket recess correspond in size and shape.

In one embodiment, the mating tool is located on an external surface of the mobile battery powered device. In another embodiment, the mating tool is located on an internal surface of the mobile battery powered device. In a further embodiment, the mobile battery powered device is separable to expose the mating tool. In another embodiment, the mobile battery powered device includes a first piece and a second piece, where the mating tool is integral to the first piece. In a further embodiment, the first piece is separable from the second piece and the battery cover is on the second piece. In another embodiment, the first piece comprises a cover plate that surrounds at least a portion of the second piece.

In one embodiment, the mating tool is a blade and the socket recess is a slot. In another embodiment, the battery cover includes threads that engage threads on the mobile battery powered device. The battery cover screws into the mobile battery powered device. In another embodiment, the battery cover is located on an external surface of the mobile battery powered device. In another embodiment, the battery cover is located on an internal surface within the mobile battery powered device. In another embodiment, the mating tool is retractable into the mobile battery powered device.

A second apparatus includes a first piece of a mobile battery powered device. The first piece includes a mating tool. The first piece is separable from the mobile battery powered device. The second apparatus includes a second piece of the mobile battery powered device. The second piece includes a battery cover, where the battery cover includes a socket recess. The mating tool and socket recess correspond in size and shape, and the mating tool is operable to dislodge the battery cover from the mobile battery powered device when the mating tool is engaged with the socket recess of the battery cover.

In one embodiment, the first piece couples to the second piece to form an exterior surface of the mobile battery powered device. In another embodiment, the first piece includes a cover plate that surrounds at least a portion of the second piece. In another embodiment, separating the first piece from the mobile battery powered device exposes the battery cover. In another embodiment, the second piece includes a battery compartment, and the battery compartment has two or more L-shaped slots where the battery cover includes two or more protrusions that align with the L-shaped slots. Inserting the battery cover into the battery compartment with the protrusions aligned with the L-shaped slots and turning the battery cover after insertion engages the L-shaped slot to secure the battery cover to the battery compartment.

In one embodiment, the battery cover includes threads that engage threads on the mobile battery powered device, where the battery cover screws into the mobile battery powered device. In another embodiment, the mating tool is located on an external surface of the first piece.

A third apparatus includes a mobile battery powered device with a battery cover where the battery cover includes a socket recess. The apparatus includes a mating tool for the socket recess. The mating tool is integral to the mobile battery powered device and is located on an external surface of the mobile battery powered device. The mating tool and socket recess correspond in size and shape and the mobile battery powered device includes a first piece and a second piece. The mating tool is integral to the first piece and the first piece is separable from the second piece. The battery cover is on the second piece and separating the first piece from the second piece exposes the battery cover.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

Furthermore, the described features, structures, or characteristics of the embodiments may be combined in any suitable manner. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Figure 1A:
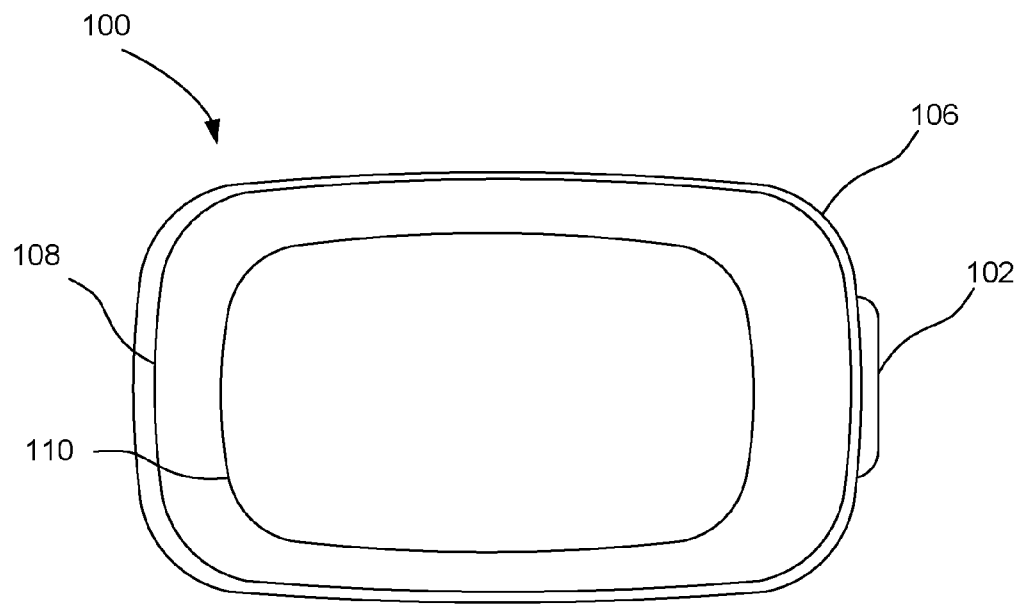
FIG. 1A is a front view illustrating one embodiment of a mobile battery powered device.

Descriptions of Figures may refer to elements described in previous Figures, like numbers referring to like elements. FIG. 1A is a front view illustrating one embodiment of a mobile battery powered device 100. Although the mobile battery powered device 100 is shown and described with certain components and functionality, other embodiments of the mobile battery powered device 100 may include fewer or more components to implement less or more functionality.

The illustrated mobile battery powered device 100 is a personal security alarm. However, the mobile battery powered device 100 may be another battery powered device including but not limited to a mobile phone, music player, video player, fitness tracker, GPS device, radio, wearable computer, game console, camera, watch, or other similar battery powered device.

The illustrated mobile battery powered device 100 includes a removable battery and a removable battery cover (not visible in FIG. 1A). Battery covers may be manufactured for easy removal without the need of a specialized tool for many devices. However, for smaller devices and smaller batteries, a removal tool may be used to remove the battery cover and access the battery compartment. A separate removal tool may be lost, misplaced, temporarily inaccessible, or otherwise inaccessible when a user needs to replace the battery.

Embodiments described herein include a tool integral to the mobile battery powered device 100. By doing so, the battery cover removal tool is always accessible when needed. There is no need to remember where one left a removal tool and no lost time searching for such a separate removal tool.

The illustrated embodiment depicts a battery cover removal tool [hereinafter "mating tool" or "mating tool 102"]. In the illustrated embodiment, the mating tool 102 is located on an external surface on the mobile battery powered device 100. In other embodiments, the mating tool 102 may be in other locations. In some embodiments, the mating tool 102 is located on an internal surface of the mobile battery powered device 100. For example, the mobile battery powered device 100 may be separable to expose the mating tool 102. In some embodiments, the mating tool 102 is located on a cover plate of the mobile battery powered device 100.

In some embodiments, the mobile battery powered device 100 includes multiple pieces or parts. In such embodiments, the mating tool 102 may be located on a first piece of the mobile battery powered device 100 and the battery cover may be located on a second piece of the mobile battery powered device 100. The mobile battery powered device 100 may require that the first and second piece be connected to be complete, to include a clip, to function, etc. but the first and second piece may be separable in order to remove the battery cover and access the battery compartment.

The illustrated embodiment depicts a cover or first piece 106 and a second piece 108. In the illustrated embodiment, the second piece 108 depicts a button 110 used for a personal security alarm. In the illustrated embodiment, the first piece 106 is a protective cover or shell. The second piece 108 snaps into the first piece 106.

In some embodiments, the second piece is operable without the first piece and the first piece is a cover plate that connects to the second piece to provide protection to the second piece. In another embodiment, the second piece is interchangeable with multiple first pieces. The first pieces may be a shell of some type that may be a type of jewelry, such as a pendant, a wrist band, a clip, etc. and may provide functionality to allow a user to attach the mobile battery powered device 100 to clothing, to a body part, to an accessory such as a handbag, etc. The first pieces may have aesthetic appeal, such as jewelry. The first piece may also have additional electronic functionality, such as providing a time function, a stopwatch function, etc. or may transmit a signal to a wireless carrier, such as a cellular network or a satellite network.

The second piece may be an alerting device and may include one or more buttons and the alerting device sends a wireless alert signal to another receiving device, such as a mobile phone, a tablet computer, a laptop computer, etc. in response to one or more buttons being pressed. The receiving device may then send out an alert to various parties to notify the parties of some type of distress by the user of the alerting device. In one embodiment, buttons of the second piece are accessible with the first piece in place. In another embodiment, the first piece includes buttons that engage buttons of the first piece.

The illustrated embodiment depicts the mating tool 102 as a simple blade. The sizing, shape, and dimensions of the mating tool 102 would correspond to a socket recess on the battery cover of the mobile battery powered device 100. In the illustrated embodiment, the socket recess on the battery cover of the mobile battery powered device 100 is a slot. The shape and size of the blade corresponds to the shape and size of the slot.

Figure 1B:
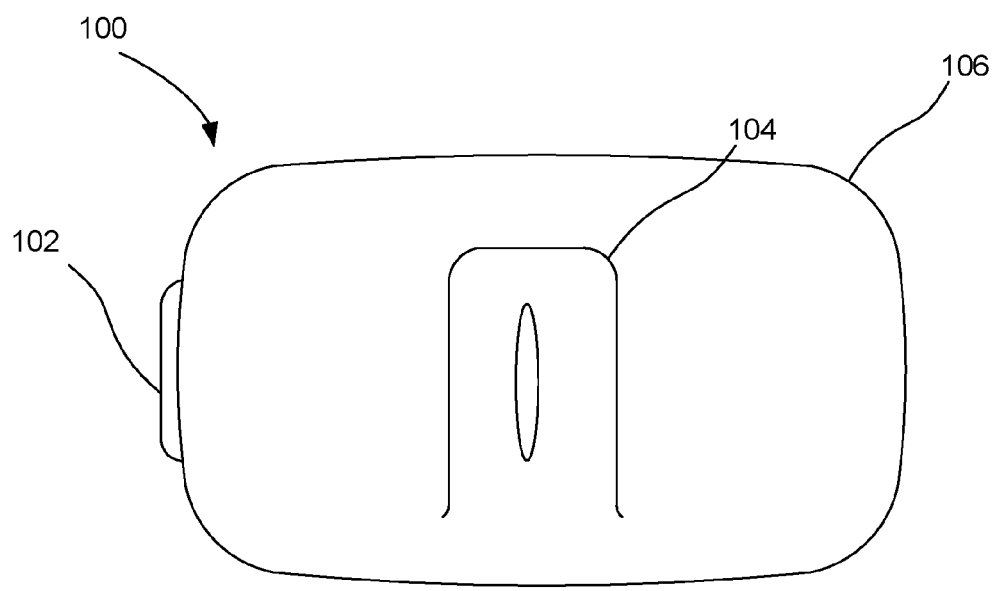
FIG. 1B is a rear view illustrating one embodiment of the mobile battery powered device of FIG. 1A.

FIG. 1B is a rear view illustrating one embodiment of the mobile battery powered device 100 of FIG. 1A. As is illustrated, the mating tool 102 protrudes from a side of the mobile battery powered device 100 and is visible in the front view of FIG. 1A and the rear view of FIG. 1B. In the illustrated embodiment, the mating tool 102 protrudes on an external surface of the mobile battery powered device 100, however, the mating tool 102 may protrude from an internal surface of the mobile battery powered device 100 within a cavity of the mobile battery powered device 100. The mating tool 102 may be integral to a cover or cover plate of the mobile battery powered device 100 and when the cover or cover plate is detached from the mobile battery powered device 100, the mating tool 102 will be protruding and useable. In another embodiment, the mating tool is retractable into the mobile battery powered device. For example, a button, a lever, etc. may be used to move the mating tool into a position for engaging the battery cover.

Also depicted in FIG. 1B is an attachment clip 104 for attaching the mobile battery powered device 100 to a belt or other piece of clothing or bag. In some embodiments, the mating tool 102 may be located on the attachment clip 104. In the illustrated embodiment, only the first piece 106 is visible as the first piece 106 encapsulates the rear of the second piece 108.

Figure 1C:
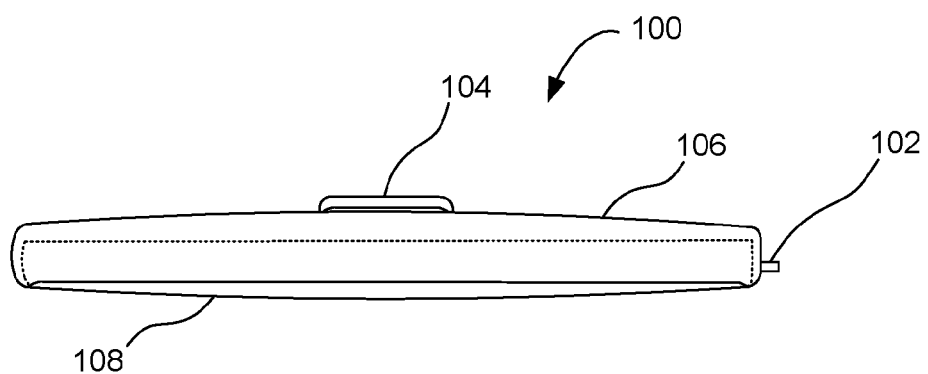
FIG. 1C is a side view illustrating one embodiment of the mobile battery powered device of FIGS. 1A and 1B.

FIG. 1C is a side view illustrating one embodiment of the mobile battery powered device of FIGS. 1A and 1B. Although the mobile battery powered device 100 is shown and described with certain components and functionality, other embodiments of the mobile battery powered device 100 may include fewer or more components to implement less or more functionality.

In the illustrated embodiment, the mating tool 102 is depicted as extending out of the side external surface of the mobile battery powered device 100. The mating tool 102 extends out of the first piece 106. The illustrated embodiment depicts the mating tool 102 as a simple blade. In illustrated embodiment, the dotted line depicts the second piece 108 within the first piece 106.

Figure 2A:
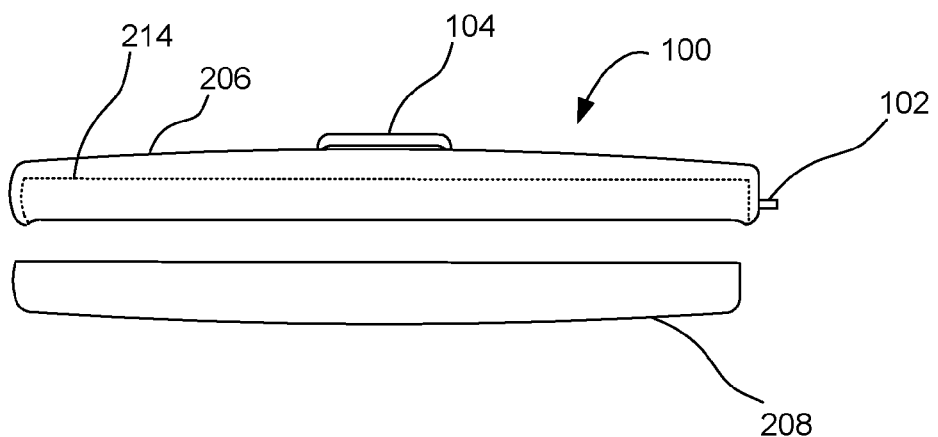
FIG. 2A is a side view illustrating one embodiment of the mobile battery powered device of FIGS. 1A, 1B, and 1C.

FIG. 2A is a side view illustrating one embodiment of the mobile battery powered device 100 of FIGS. 1A, 1B, and 1C in which the mobile battery powered device 100 has split into two pieces, a first piece 206 and a second piece 208. In the illustrated embodiment, the first piece 206 includes the mating tool 102 and the second piece 208 includes a battery cover (shown in FIG. 2B). In some embodiments, the mobile battery powered device 100 may separate into various pieces. In some embodiments, the mating tool 102 and the battery cover would be located on separate pieces, allowing the mating tool 102 to easily be used to remove the battery cover.

In some embodiments, the first piece 206 may be a cover, cover plate, clip, keyring loop, etc. of some kind that is removable from the second piece 208 of the mobile battery powered device 100. In the illustrated embodiment, the cover plate or first piece 206 surrounds at least a portion of the second piece 208. For example, the cover plate or first piece surrounds corners or other sensitive portions of the second piece 208 and may serve to protect the second piece 208. For example, the cover plate may cushion impact and may be constructed of one or more materials that absorb shock of a blow to the mobile battery powered device 100. In some embodiments, the first piece 206 and the second piece 208 both include components powered by a battery and may be operable only when the first piece 206 and the second piece 208 are connected, either mechanically or electronically. The illustrated embodiment also depicts a cavity 214 as shown by the dotted line. The second piece 208 fits into and snaps into the cavity 214.

Some embodiments include a mobile battery powered device 100 including two or more electronically connected pieces in which one piece includes a mating tool 102 and another piece includes a battery cover and where the mating tool 102 corresponds in size and shape to a socket recess on the battery cover.

In the illustrated embodiment, the second piece 208 snaps into a cavity of the first piece 206. The first piece 206 and the second piece 208 may join or connect in various ways. For example, the pieces may include mechanical fasteners such as bolts, rivets, pins, or screws etc. The two pieces may connect through a snap ring, threads, gasket, etc. The two pieces may connect through non-mechanical means, for example, by adhesives, magnets, etc. In some embodiments, the pieces are connected through a joint or clasp, hook and loop fastener, etc. In some embodiments, the joint or clasp that connects the two pieces may also function as the mating tool 102. In such embodiments, the mating tool 102 will be sized and shaped to interface with the socket recess and will also function as a joint or clasp for connecting the first piece 206 and second piece 208.

Figure 2B:
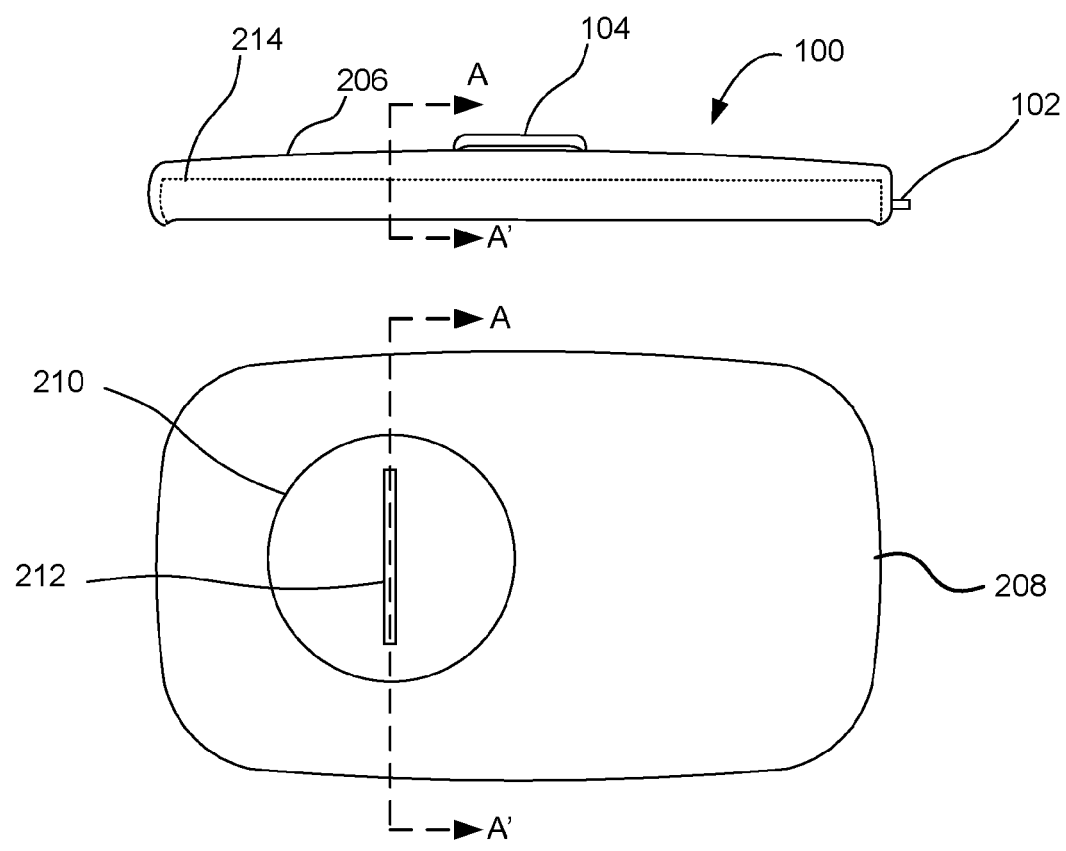
FIG. 2B is a side view of the first piece and a front view of the second piece illustrating the embodiment of the mobile battery powered device of FIG. 2A.

FIG. 2B is a side view of the first piece 206 and a front view of the second piece 208 illustrating the embodiment of the mobile battery powered device 100 of FIG. 2A. In the illustrated front view of the second piece 208, a battery cover 210 is visible. In the illustrated embodiment, the battery cover 210 is on an internal surface of the mobile battery powered device 100 and is exposed only when the first piece 206 and the second piece 208 are separated. The first piece 206 includes the mating tool 102 integral to the first piece 206.

FIG. 2B further depicts a socket recess 212 on the battery cover 210. In the illustrated embodiment, the socket recess 212 is a simple slot. In some embodiments, the mating tool 102 includes a screw drive. The illustrated embodiment depicts a flat blade for the mating tool 102 and a slot for the socket recess 212. Other embodiments may include different shapes for the mating tool 102 and corresponding shapes for the socket recess 212. The mating tool 102 may be flat, square, hex, cruciform, or any other screw drive types too lengthy to list but are known to skilled artisans. The mating tool 102 and socket recess 212 on the battery cover will correspond to each other in shape and size so that the mating tool 102 will properly mate with the socket recess and allow for the battery cover to be removed. For example, the battery cover 210 may include threads that engage threads on the mobile battery powered device 100 where the battery cover 210 screws into the mobile battery powered device 100.

Figure 2C:
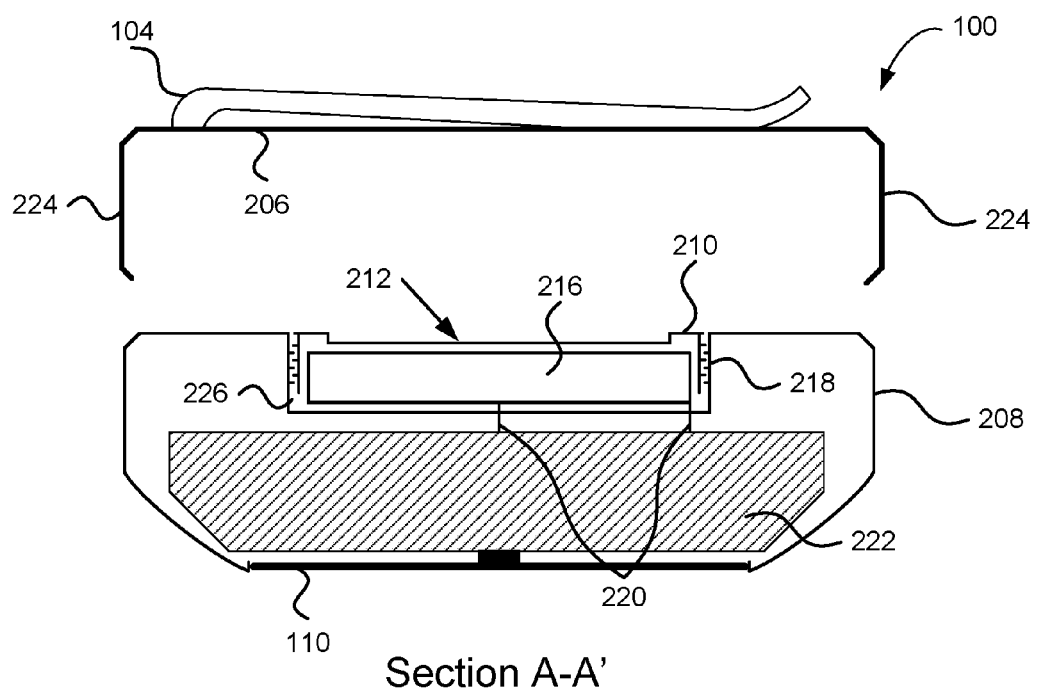
FIG. 2C is a section A-A' view of the first piece and the second piece of the mobile battery powered device of FIG. 2A.

FIG. 2C is a section A-A' of the first piece 206 and the second piece 208 of the mobile battery powered device 100 of FIG. 2A cut along the section line A-A' as shown in FIG. 2B. The first piece 206, in the depicted embodiment, is a cover plate with a hollow opening to allow the first piece 206 to sides 224 to snap down around the second piece 208. The first piece 206 includes an attachment clip 104. In other embodiments, the first piece 206 or second piece 208 may include a loop that allows the mobile battery powered device 100 to connect to a lanyard, belt loop, etc. In other embodiments, the first piece 206 or second piece may include a strap, such as a wrist strap, chest strap, arm band, and the like to connect the mobile battery powered device 100 to a body part, to a bicycle, etc.

The second piece 208 includes a battery cover 210 engaged with the second piece 208 with threads 218 of a battery compartment 226 and battery cover 210. Other embodiments of the battery compartment 226 may include L-shaped slots that engage protrusions on the battery cover 210, protrusions that allow for a friction fit with the battery cover 210, etc. The battery cover 210 holds a battery 216 in place to engage battery connectors 220 that connect to electronics 222 of the second piece 208. The battery cover 210 also includes a socket recess 212 that corresponds with a shape of the mating tool 102. The second piece 208 also includes one or more buttons 110, switches, dials, etc. connected to the electronics 222 of the second piece 208. In one embodiment, the mating tool 102 engages the socket recess 212 of the battery cover 210 to rotate the battery cover 210 to remove the battery cover 210 to access the battery 216. Other embodiments may include a mating tool 102 that fits in a socket recess 212 used to pry off the battery cover 210.

While a battery cover 210 and battery are depicted in FIGS. 2A, 2B and 2C, the mating tool 104 may also access other covers, such as a compartment that hold a memory card, such as a micro secure digital ("SD") card, or the like, or such as buttons, controls, etc. In other embodiments, the second piece 208 may have multiple covers, each with a socket recess 212 that mates with the mating tool 102 operable open the cover. While the first piece 206 is depicted as a cover plate that slides around the second piece 208, one of skill in the art will recognize other ways for the first piece 206 to engage the second piece 208. In addition, while the battery cover 210 is depicted with threads that mate with threads 218 of the battery compartment 226 and battery cover 210, one of skill in the art will recognize other ways that that mating tool 102 may engage the battery cover 210 or other cover to open the battery compartment 226 or other compartment for access.

Figure 3A:
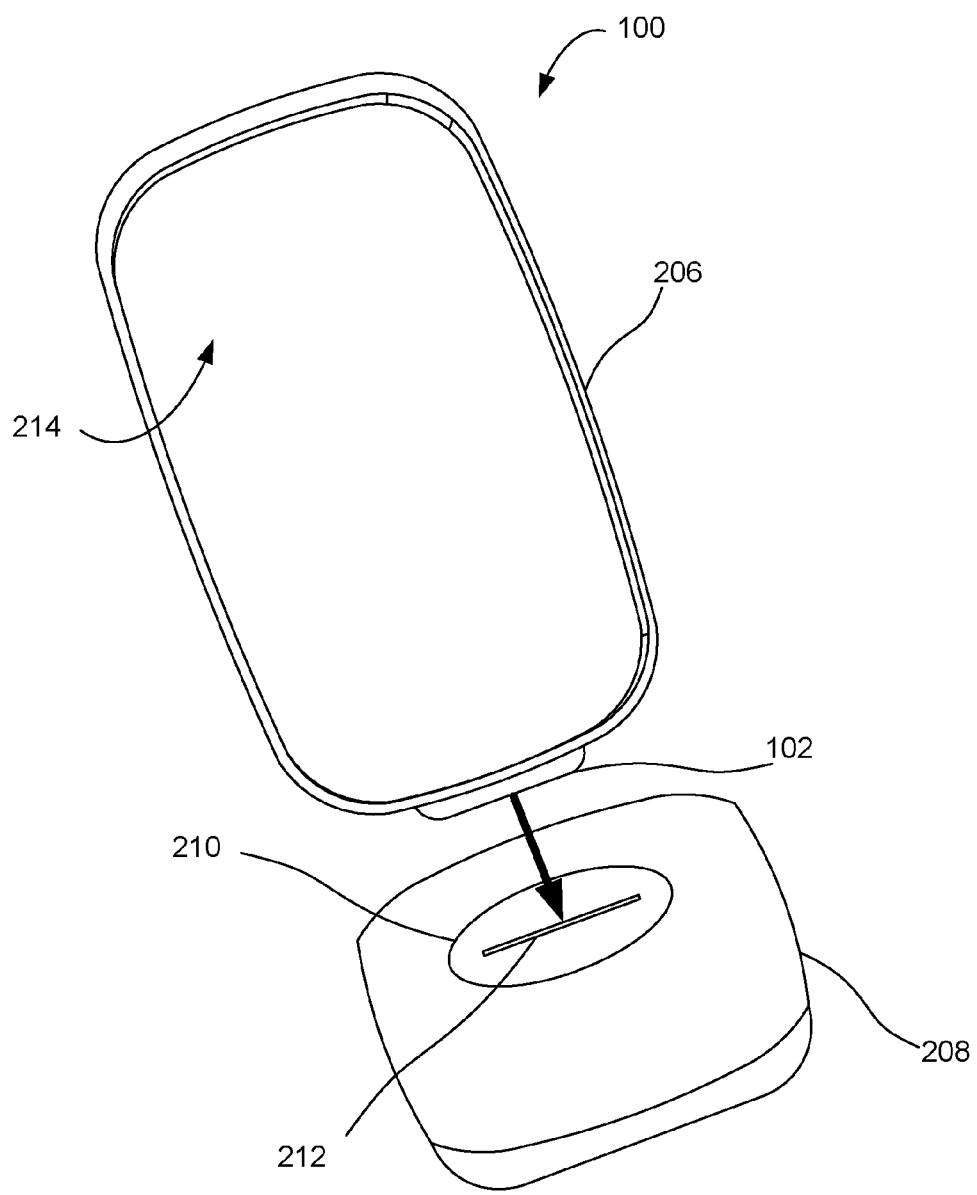
FIG. 3A is a perspective view of one embodiment of the mobile battery powered device.

FIG. 3A is a perspective view of one embodiment of the mobile battery powered device 100. The illustrated embodiment depicts the first piece 206 rotated with the mating tool 102 lined up with the socket recess 212 of the battery cover 210 of the second piece 208. The illustrated embodiment depicts a cavity 214 in the first piece 206. The second piece 208 snaps into the cavity 214 when the first piece 206 and the second piece 208 are connected.

Figure 3B:
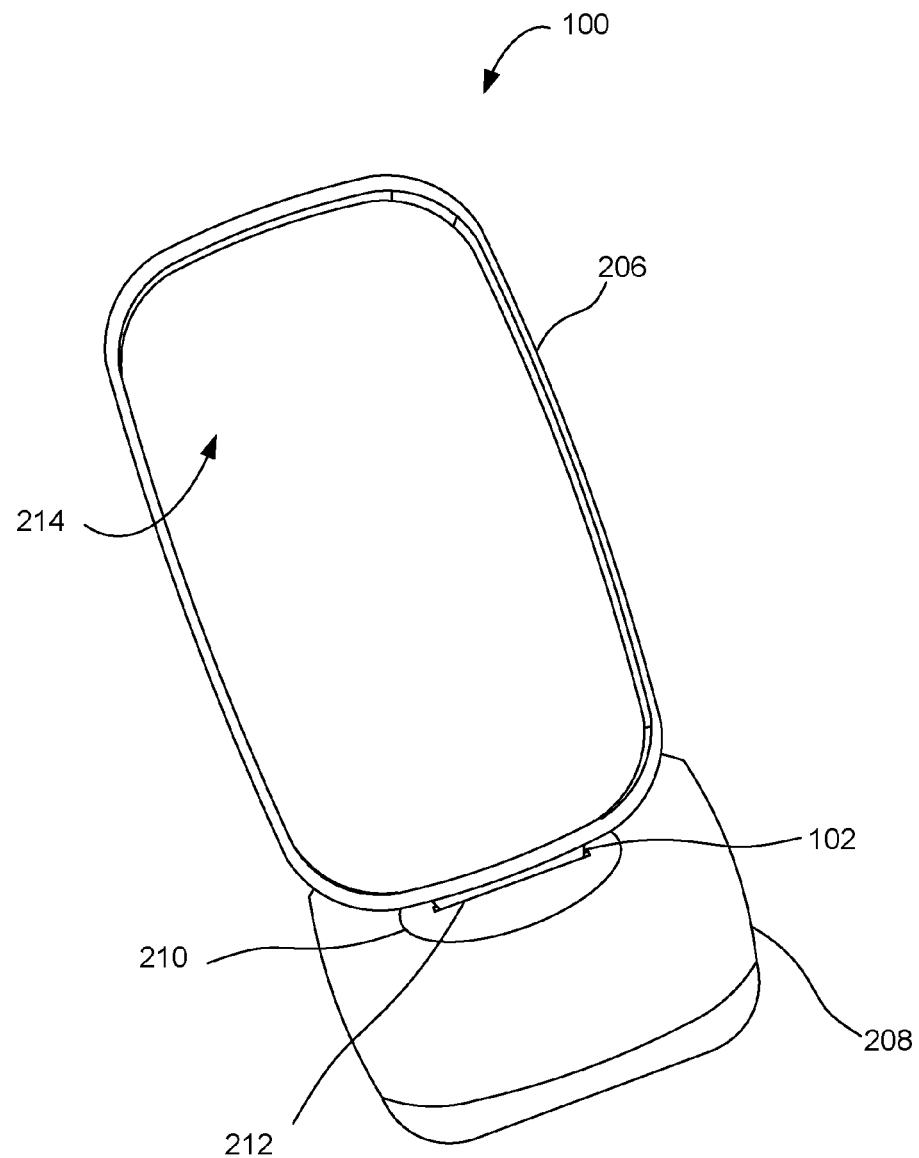
FIG. 3B is a perspective view of one embodiment of the mobile battery powered device with a mating tool inserted into a socket recess.

FIG. 3B is a perspective view of one embodiment of the mobile battery powered device 100 with the mating tool 102 inserted into the socket recess 212. With the mating tool 102 inserted into the socket recess 212, the first piece 206 may rotate with respect to the second piece 208 and unscrew the battery cover 210. With a mating tool 102 integral to the mobile battery powered device 100 itself, there is no need to find a specialized removal tool when a user needs to remove a battery cover 210. The mating tool 102 is connected to the mobile battery powered device 100 and is not removable. With a non-removable mating tool 102 no time will be lost searching and locating a removal tool. The mobile battery powered device 100 includes the mating tool 102 integral to the mobile battery powered device 100.

In some embodiments, the location of the mating tool 102 and the socket recess 212 may be switched from what has been described and depicted herein. For example, the mating tool 102 may be located on the battery cover 210 and the mobile battery powered device 100 may include a socket recess 212 that corresponds in size and shape to the mating tool 102 on the battery cover 210.

Figure 4:
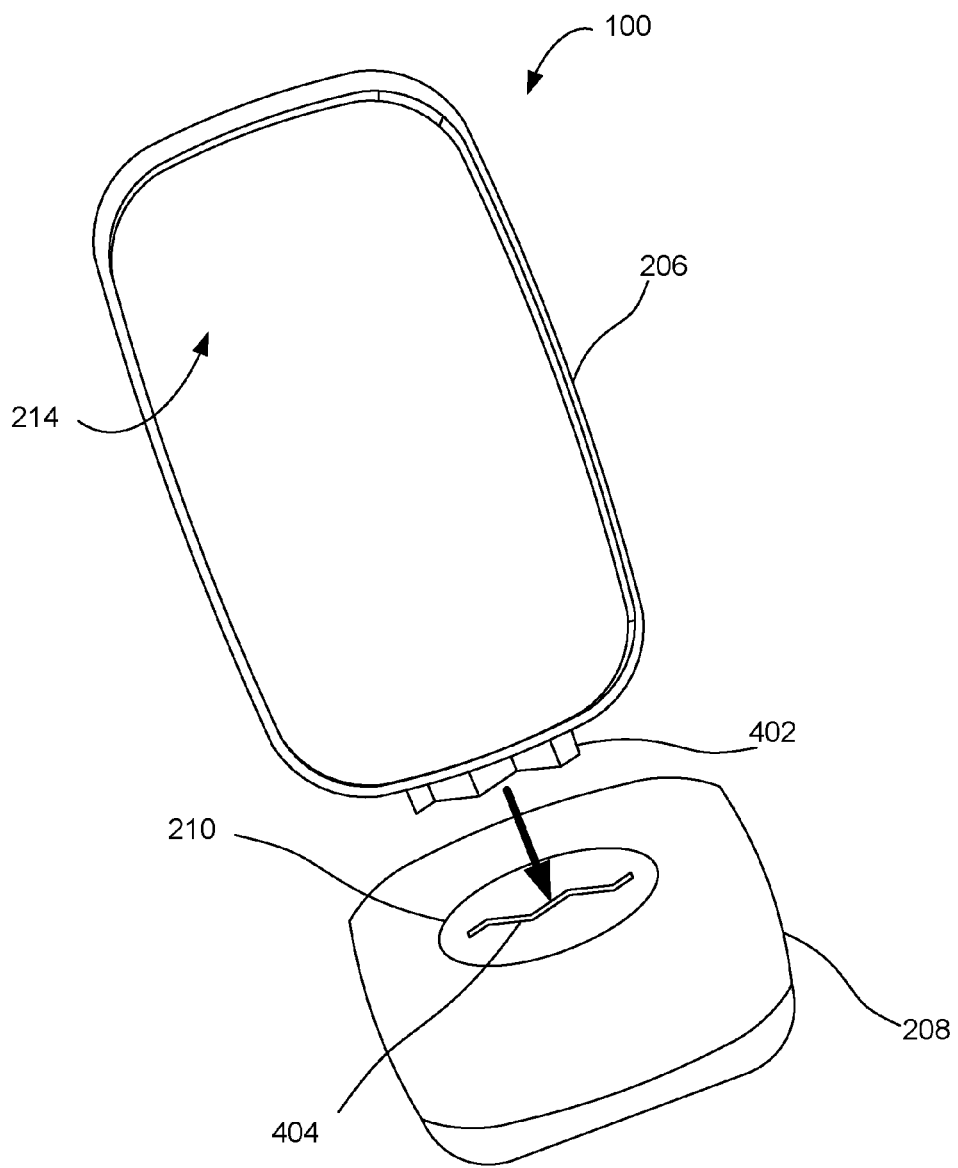
FIG. 4 is a perspective view of an alternate embodiment of the mobile battery powered device with a second mating tool design.

FIG. 4 is a perspective view of an alternate embodiment of the mobile battery powered device 100 with a second mating tool 402. The illustrated embodiment depicts the first piece 206 rotated with the mating tool 402 lined up with a second socket recess 404 of the battery cover 210 of the second piece 208. As in the embodiment of FIG. 3A, the illustrated embodiment depicts a cavity 214 in the first piece 206 and the second piece 208 snaps into the cavity 214 when the first piece 206 and the second piece 208 are connected.

The second mating tool 402 is in a zig-zag pattern, which may allow for more surface to engage with the second socket recess 404 than for other designs. The second mating tool 402 may have a more secure connection to the second socket recess 404 than the mating tool 102 and socket recess 212 of the embodiment of FIGS. 1A-C, 2A-C and 3A-B.

Figure 5A:
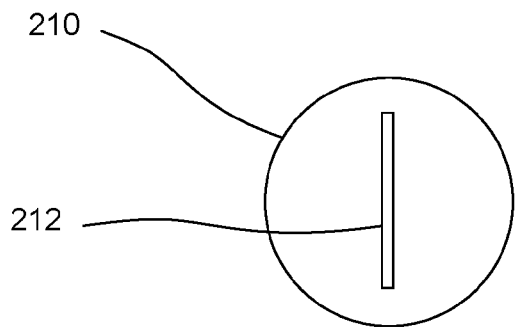
FIG. 5A is a front view of the battery cover and socket recess of the second piece illustrating the embodiment of the mobile battery powered device of FIGS. 1A-C, 2A-C and 3A-B.
Figure 5B:
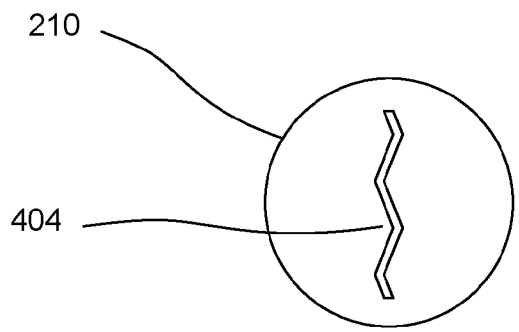
FIG. 5B is a front view of the battery cover and second socket recess of the second piece illustrating the embodiment of the mobile battery powered device compatible with the second mating tool of FIG. 4.
Figure 5C:
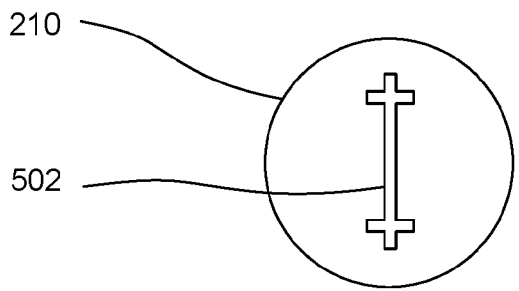
FIG. 5C is a front view of the battery cover of the second piece illustrating a third socket recess of the mobile battery powered device compatible with a third mating tool.
Figure 5D:
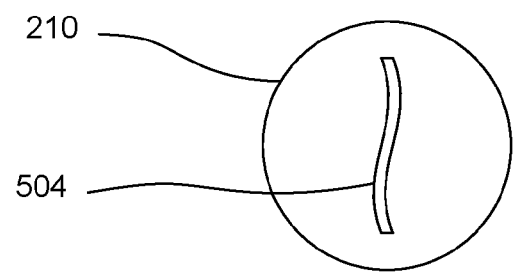
FIG. 5D is a front view of the battery cover of the second piece illustrating a fourth socket recess of the mobile battery powered device compatible with a fourth mating tool.

FIGS. 5A-D depict various designs of socket recesses 212, 404, 502, 506. FIG. 5A is a front view of the battery cover 210 and socket recess 212 of the second piece 208 illustrating the embodiment of the mobile battery powered device 100 of FIGS. 1A-C, 2A-C and 3A-B. FIG. 5B is a front view of the battery cover 210 and second socket recess 404 of the second piece 208 illustrating the embodiment of the mobile battery powered device 100 compatible with the second mating tool 402 of FIG. 4. FIG. 5C is a front view of the battery cover 210 of the second piece 208 illustrating a third socket recess 502 of the mobile battery powered device 100 compatible with a third mating tool. FIG. 5D is a front view of the battery cover 210 of the second piece 208 illustrating a fourth socket recess 504 of the mobile battery powered device 100 compatible with a fourth mating tool.

Each socket recess 212, 404, 502, 504 has unique advantages and disadvantages in terms of design, functionality and security. For example, the socket recess 502 of FIG. 5C may accommodate a similarly shaped mating tool but may also accommodate a straight blade, such as the mating tool 102 of FIG. 2A. The socket recesses of FIGS. 5B and 5D may be more difficult to open without a specific mating tool design. Each socket recess 212, 404, 502, 504 presents a different amount of contact with a mating tool (e.g. 102). One of skill in the art will recognize other mating tool and corresponding socket recess designs and corresponding features and challenges.

Embodiments of the present invention may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes," "has," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A mobile battery powered device comprising:
   a first piece comprising:
      a mating tool;
      an outer surface; and
      an inner surface forming a cavity, wherein the mating tool extends outward from and substantially perpendicular to at least one of the inner surface or the outer surface, and wherein the first piece forms a cover; and
   a second piece that, with the use of friction, is removably securable within the cavity of the first piece, wherein the second piece comprises:
      a front surface;
      a rear surface opposite the front surface;
      a battery; and
      a battery cover surrounding at least a portion of the battery, wherein the battery cover has an outer surface substantially planar with the rear surface of the second piece, the battery cover having a socket recess in the outer surface and the mating tool is adapted to remove the battery cover from the second piece when the mating tool is inserted into the socket recess.

2. The mobile battery powered device of claim 1, wherein the rear surface of the second piece is in contact with the inner surface of the first piece.

3. The mobile battery powered device of claim 1, wherein the first piece and the second piece are releasably interconnected.

4. The mobile battery powered device of claim 3, wherein the battery cover and the socket recess are only visible when the first piece is separated from the second piece.

5. The mobile battery powered device of claim 1, wherein the first piece covers the entire rear surface of the second piece when the second piece is positioned in the cavity of the first piece.

6. The mobile battery powered device of claim 1, wherein the battery is not visible unless the battery cover is removed from the second piece.

7. The mobile battery powered device of claim 1, wherein the socket recess is a slot and the mating tool is a blade sized and shaped to fit into the slot.

8. The mobile battery powered device of claim 1, wherein the second piece comprises threads and the battery cover comprises threads that engage the threads of the second piece.

9. The mobile battery powered device of claim 1, wherein the mating tool is retractable into the first piece.

10. A mobile battery powered device comprising:
    a first piece comprising an outer surface, an inner surface opposite the outer surface, and a mating tool extending outwardly from and substantially perpendicular to the outer surface, wherein the inner surface forms a cavity and the first piece forms a cover; and
    a second piece comprising a battery cover having a socket recess,
    wherein the battery cover and socket recess are accessible from a rear surface of the second piece,
    wherein the rear surface of the second piece is adjacent the inner surface of the first piece when the second piece is, with the use of friction, secured within the first piece,
    wherein the mating tool extends in a direction substantially parallel to the rear surface of the second piece when the second piece is secured within the first piece,
    wherein the first piece is separable from the second piece,
    wherein the mating tool and socket recess correspond in size and shape, and
    wherein the mating tool is operable to dislodge the battery cover from the second piece when the mating tool is engaged with the socket recess of the battery cover.

11. The mobile battery powered device of claim 10, wherein the second piece snaps into the cavity of the first piece when the first piece and second piece are interconnected.

12. The mobile battery powered device of claim 10, wherein the second piece further comprises a battery, and wherein the battery cover surrounds at least a portion of the battery.

13. The mobile battery powered device of claim 10, wherein the socket recess is in an outer surface of the battery cover, and wherein the outer surface of the battery cover is substantially planar with the rear surface of the second piece.

14. The mobile battery powered device of claim 10, wherein the battery cover and socket recess are only visible when the first piece is separated from the second piece.

15. The mobile battery powered device of claim 10, wherein the socket recess is at least one of a straight slot, a zig-zag slot, a cross-shaped slot, a T-shaped slot, and a curved slot and the mating tool is shaped to fit into the slot.

16. A mobile battery powered device comprising:
    a first piece comprising:
       a cover plate having an outer surface and an inner surface;
       a plurality of sides extending outward from a perimeter of the cover plate, wherein the cover plate and the plurality of sides form a cavity; and
       a mating tool having a straight blade shape and extending outward from and substantially perpendicular to a side in the plurality of sides; and
    a second piece that, with the use of friction, is removably securable within the cavity of the first piece and comprises:
       a battery; and a battery cover surrounding at least a portion of the battery, wherein the battery cover has an outer surface with a socket recess having a straight slot shape, wherein the socket recess is only accessible when the second piece is separated from the first piece, and wherein the mating tool engages the socket recess to remove the battery cover from the second piece.

17. The mobile battery powered device of claim 16, wherein the outer surface of the battery cover is substantially planar with a rear surface of the second piece, and wherein the rear surface of the second piece is positioned adjacent the inner surface of the first piece cover plate when the second piece is positioned in the cavity of the first piece.

18. The mobile battery powered device of claim 16, wherein the battery is not visible unless the battery cover is removed from the second piece.

19. The mobile battery powered device of claim 16, wherein the second piece comprises threads and the battery cover comprises threads that engage the threads of the second piece.

20. The mobile battery powered device of claim 16, wherein the mating tool is retractable into the first piece.

* * * * *